US012633096B2

(12) United States Patent
Ham et al.

(10) Patent No.: US 12,633,096 B2
(45) Date of Patent: May 19, 2026

(54) APPARATUS AND METHOD FOR CONFIDENCE CALIBRATION BASED ON ADAPTIVE LABEL SMOOTHING

(71) Applicant: UIF (University Industry Foundation), Yonsei University, Seoul (KR)

(72) Inventors: Bum Sub Ham, Seoul (KR); Jong Youn Noh, Seoul (KR); Hye Kang Park, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 242 days.

(21) Appl. No.: 18/394,865

(22) Filed: Dec. 22, 2023

(65) Prior Publication Data

US 2024/0265685 A1     Aug. 8, 2024

(30) Foreign Application Priority Data

Feb. 2, 2023     (KR) ........................ 10-2023-0014420

(51) Int. Cl.
*G06K 9/00*          (2022.01)
*G06V 10/764*      (2022.01)
*G06V 10/776*      (2022.01)

(52) U.S. Cl.
CPC .......... *G06V 10/776* (2022.01); *G06V 10/764* (2022.01)

(58) Field of Classification Search
CPC .... G06V 10/776; G06V 10/764; G06V 10/82; G06V 10/84; G06N 3/047; G06N 3/08
See application file for complete search history.

(56) References Cited

U.S. PATENT DOCUMENTS

2022/0108220 A1       4/2022   Qin et al.
2022/0343178 A1 *   10/2022   Hall ........................ G06N 3/045
2025/0131694 A1 *     4/2025   Iscen .................... G06V 10/761

FOREIGN PATENT DOCUMENTS

CN             112434722 A   *   3/2021   ......... G06F 18/2415
CN             115171151 A   *  10/2022   .......... G06V 10/764
KR   10-2018-0135616 A       12/2018

OTHER PUBLICATIONS

Rafael Muller et al., "When Does Label Smoothing Help?", 33rd Conference on Neural Information Processing Systems (NeurIPS 2019), 2019, pp. 1-13, Vancouver, Canada.
Korean Office Action for related KR Application No. 10-2023-0014420 mailed Feb. 23, 2026 from Korean Intellectual Property Office.

(Continued)

*Primary Examiner* — Xin Jia
(74) *Attorney, Agent, or Firm* — Paratus Law Group, PLLC

(57)          ABSTRACT

Provided is an operation method of a computing device for providing a confidence calibration function based on label smoothing. The operation method includes inputting image data to be classified into an image classification model, outputting logit output values and prediction probability values of the image data by the image classification model, and outputting a label smoothing loss function by the image classification model by using learnable margin parameters or a label smoothing weighting based on an image classification difficulty level or all.

15 Claims, 4 Drawing Sheets

$$L_{CE} + \lambda \sum_{k} \max(0, \max_{j} z_j - z_k - M)$$

(56) References Cited

OTHER PUBLICATIONS

Ujwal Krothapalli et al., "One Size Doesn't Fit All: Adaptive Label Smoothing", ICLR 2021 Conference, Sep. 28, 2020, pp. 1-20, https://openreview.net/forum?id=wqRvVvMbJAT.

Bingyuan Liu et al. "The Devil is in the Margin: Margin-based Label Smoothing for Network Calibration", Nov. 30, 2021, pp. 80-88, https://doi.org/10.48550/arXiv.2111.15430.

Seyed Mehdi Iranmanesh et al., "Attribute Adaptive Margin Softmax Loss using Privileged Information", 2019, pp. 1-13, https://arxiv.org/pdf/2009.01972.

* cited by examiner

FIG. 2

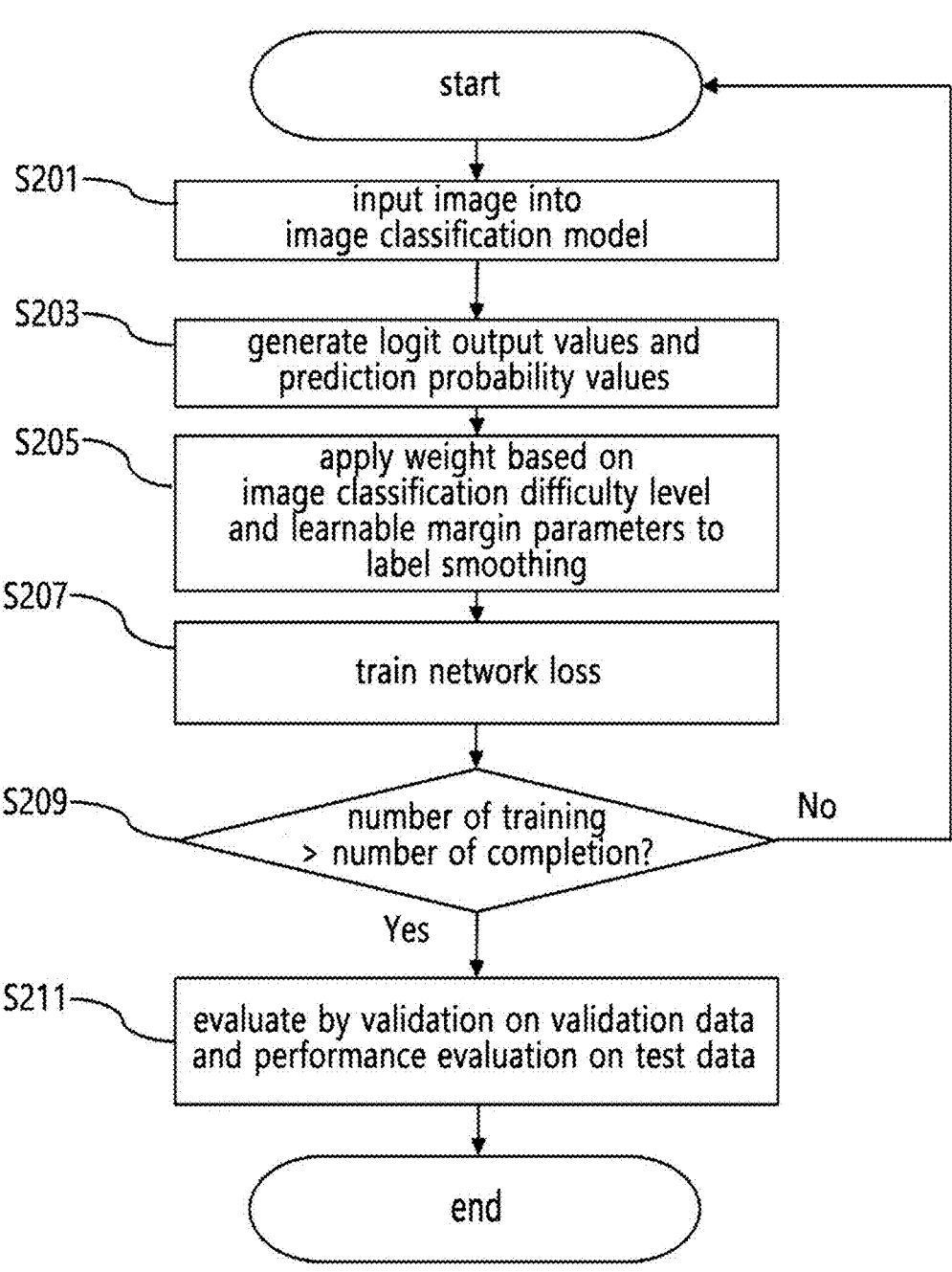

start

S201 — input image into
image classification model

S203 — generate logit output values and
prediction probability values

S205 — apply weight based on
image classification difficulty level
and learnable margin parameters to
label smoothing S207 — train network loss S209 — number of training
> number of completion?  No Yes S211 — evaluate by validation on validation data
and performance evaluation on test data end $$L_{CE} + \lambda \sum_{k} \max(0, \max_{j} z_j - z_k - M)$$

1

APPARATUS AND METHOD FOR CONFIDENCE CALIBRATION BASED ON ADAPTIVE LABEL SMOOTHING

CROSS REFERENCE TO RELATED APPLICATION

This application claims priority under 35 U.S.C. § 119(a) to Korean 5 Patent Application No. 10-2023-0014420 (filed on Feb. 2, 2023) which is hereby incorporated by reference in its entirety.

BACKGROUND

The present disclosure relates to confidence calibration that enables a deep learning network to have a reliable final prediction probability value (confidence).

Outputting an accurate confidence value from an image classification model is important in training a deep learning network.

For example, when an image is input and an output prediction probability for a particular class is 0.8, this should mean that there is an 80% probability that the image belongs to the class. Through this, it may be determined whether or not to follow the prediction value of the model when making decisions.

That is, a reliable image classification model need to make the prediction accuracy and a confidence value (prediction probability, confidence) for samples match.

However, recent deep learning models have a problem of being overconfident, with prediction probability greater than actual accuracy. In this way, a technology for ensuring that the accuracy and the prediction probability of a model match is a confidence calibration technology. To solve this, conventional confidence calibration technologies use an existing cross-entropy loss function and a new loss function for alleviating an overconfidence problem when training a model.

In addition, label smoothing is a technology proposed to solve the overfitting problem of deep learning models and improve generalization performance. Label smoothing is itself a confidence-aware learning method that is effective in solving the overconfidence problem of the models. The overconfidence problem is a problem in which a prediction probability output value for a particular label is greater than an actual probability, and the distribution of output values looks like a delta function.

Label smoothing alleviates the overconfidence problem by making the maximum output value of the prediction probability small and equally smoothing the output values for different labels (regularization). However, there is a still a problem in which making output values of prediction probability similar for all classes has a negative effect on the classification (discriminative) ability that a video recognition model should ultimately have.

To solve this problem, a succeeding method proposes a loss function that does not apply label smoothing when output values of prediction probability are close to each other within a particular level.

That is, in outputting the loss function, when a logit distance corresponding to an output value difference is equal to or less than a predetermined margin, label smoothing is not applied (see Equation 1). Herein, the output value difference may be calculated as a difference between the logit value of the class corresponding to the maximum output value and the logit values of the other classes.

2

$$L_{MbLS} = L_{CE} + \max\left(0, \max_i(z_i) - z_j - m\right) \qquad \text{[Equation 1]}$$

$L_{MbLS}$ denotes a loss function in the related art, $L_{CE}$ denotes a cross-entropy error (loss), $\max_i(z_i) - z_j$ denotes logit distance, and $m$: margin The method applies the same margin (m) to all images so that each image has a similar output value difference. This does not reflect unique features of images and does not completely achieve the purpose of adjusting confidence (maximum prediction probability value).

The foregoing is intended merely to aid in the understanding of the background of the present disclosure, and is not intended to mean that the present disclosure falls within the purview of the related art that is already known to those skilled in the art.

SUMMARY

The present disclosure is directed to calibrate the confidence of a deep learning network by using learnable margin parameters that are set considering features of classes.

The present disclosure is directed to calibrate the confidence of a deep learning network by applying the characteristic that the distribution of prediction probability values varies depending on an image classification difficulty level, during label smoothing.

According to an embodiment of the present disclosure, an operation method of a computing device for providing a confidence calibration function based on label smoothing, the operation method including: (a) inputting image data to be classified into an image classification model; (b) outputting, by the image classification model, logit output values and prediction probability values of the image data; and (c) outputting, by the image classification model, a label smoothing loss function by using learnable margin parameters or a label smoothing weighting based on an image classification difficulty level or all.

According to an embodiment of the present disclosure, a computing device for providing a confidence calibration function based on label smoothing, the computing device comprising: a memory; an image classifier; and a processor for controlling operation of the image classifier, wherein the processor is configured to (a) input image data to be classified into an image classification model, (b) make the image classification model output logit values and prediction probability values of the image data, and (c) make the image classification model output a label smoothing loss function by using learnable margin parameters or a label smoothing weighting based on an image classification difficulty level or all.

According to the present disclosure, by using learnable margin parameters that are set considering features of classes, a prediction probability value for a correct answer class and actual accuracy (correctness likelihood) can be maintained at the same level.

According to the present disclosure, during label smoothing, by applying the characteristic that the distribution of prediction probability values varies depending on an image classification difficulty level, a prediction probability value for a correct answer class and actual accuracy (correctness likelihood) can be maintained at the same level.

BRIEF DESCRIPTION OF THE DRAWINGS

FIG. 2 shows a flowchart of a confidence calibration operation based on label smoothing according to an embodiment of the present disclosure.

DETAILED DESCRIPTION

Figure 1:
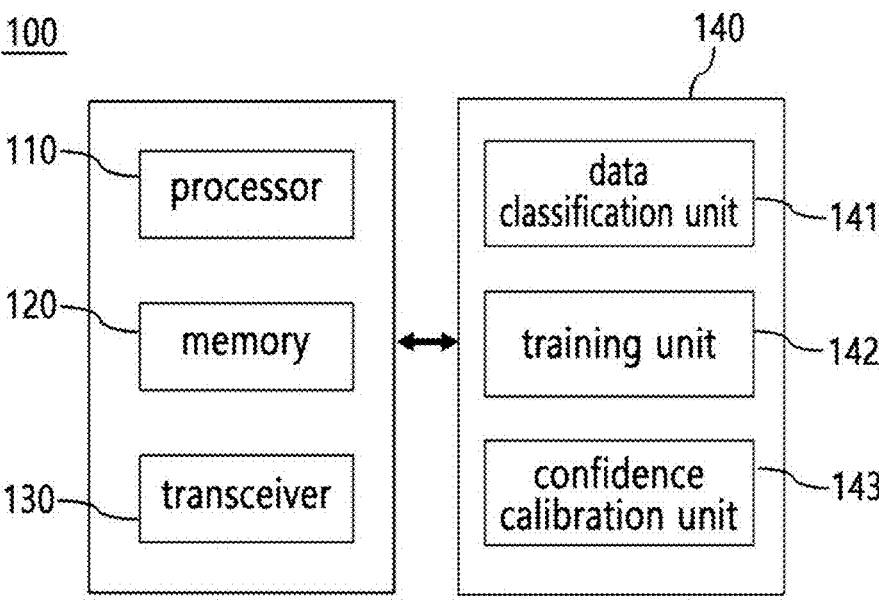
FIG. 1 shows a computing device 100 according to an embodiment of the present disclosure.

A variety of modifications may be made to the present disclosure and there are various embodiments of the present disclosure, particular embodiments of the present disclosure are illustrated in the drawings and will be described in detail. However, the present disclosure is not limited thereto, and the exemplary embodiments can be construed as including all modifications, equivalents, or substitutes in a technical concept and a technical scope of the present disclosure.

Throughout the description, it should be understood that when an element is referred to as being "connected" to another element, it can be "directly connected" to the other element or "electrically connected" thereto with intervening elements therebetween.

Terms "first", "second", "A", "B", etc. can be used to describe various elements, but the elements are not to be construed as being limited to the terms. The terms are only used to differentiate one element from the other elements. For example, the "first" element may be named the "second" element without departing from the scope of the present disclosure, and the "second" element may also be similarly named the "first" element. The term "and/or" includes a combination of a plurality of items or any one of a plurality of terms.

In the terms used herein, an expression used in the singular encompasses the expression of the plural, unless the context clearly means otherwise. It will be furthermore understood that the terms "comprises", "comprising", "includes", and "including" specify the presence of stated features, numbers, steps, operations, elements, components, or combinations thereof, but do not preclude the presence or addition of one or more other features, numbers, steps, operations, elements, components, or combinations thereof.

Before providing a detailed description of the drawings, it would be clarified that the division of elements in the present disclosure is merely a division according to main functions each element is responsible for. That is, two or more elements, which will be described below, may be combined into one element, or one element may be divided into two or more parts for more detailed functions. In addition to the main functions that each element is responsible for, each of the elements may additionally perform some or all of the functions that the other elements are responsible for. Some of main functions each element is responsible for may be handled and performed by the other elements.

In addition, in performing a method or an operation method, steps constituting the method may occur in an order different from an order described herein unless a specific order is clearly stated in context. In other words, the steps may be performed in the same order as described, may be performed substantially simultaneously, or may be performed in the reverse order.

The present disclosure discloses a computing device for confidence calibration using adaptive label smoothing. That is, when a network is trained, an existing cross-entropy loss function and a new adaptive margin-based label smoothing loss function are used.

According to the present technology, when a deep learning network performs confidence calibration based on label smoothing, actual probability values are applied to a label smoothing process considering the features of each image, so that the loss function and the margin are flexibly applied according to the class of the image and confidence calibration is efficiently performed.

Specifically, the label smoothing loss function increases the entropy of prediction probability distribution to prevent the network from overfitting and making overconfident predictions. In particular, confidence may be more efficiently calibrated by flexibly applying the loss function according to the input entity (instance) and the class.

Hereinafter, it is described that the computing device for confidence calibration calibrates the confidence of the deep learning network. The computing device for confidence calibration is a device that processes input data consistently and simply performs the computations required for the design of a building according to a particular model or algorithm. For example, the computing device for confidence calibration may be realized in the form of a PC, a server on a network, a smart device, or a chipset with an embedded design program.

First, the configuration of a computing device 100 for providing a label smoothing function according to an embodiment of the present disclosure will be described.

FIG. 1 shows the computing device 100 for providing a confidence calibration function based on label smoothing according to an embodiment of the present disclosure.

The components of the computing device 100, which is shown in FIG. 1, for providing the confidence calibration function based on label smoothing are exemplary. Only some of the components shown in FIG. 1 may constitute the computing device 100 that provides the confidence calibration function. Alternatively, additional component(s) in addition to the components shown in FIG. 1 may be included in the computing device 100 for providing the confidence calibration function.

As shown in FIG. 1, the computing device 100 for providing the confidence calibration function may include a processor 110, a memory 120, a communication part 130, and an image classifier 140.

The communication part 130 may use a wired or wireless communication technology to transmit or receive data to or from external devices, such as other electronic devices or servers. For example, the communication part 130 may transmit or receive sensor information, user inputs, training models, or control signals to or from the external devices.

The memory 120 may store data that support various functions of the computing device 100.

The processor 110 may determine one or more executable operations of the computing device 100. In addition, the processor 110 may control the elements of the computing device 100 to perform a determined operation.

To this end, the processor 110 may request, search for, receive, or use data in the memory 120, and may control the elements of the computing device 100 to perform a predicted operation or an operation determined as being preferred among the one or more executable operations.

The image classifier 140 may include a data classification part 141, a training part 142, and a confidence calibration part 143. The image classifier 140 will be described later.

Herein, when connection to an external device is required to perform a determined operation, the processor 110 may generate a control signal for controlling the external device and transmit the generated control signal to the external device.

In order to run an application program store din the memory 120, the processor 110 may control at least some or a combination of the elements of the computing device 100.

The computing device 100 according to an embodiment of the present disclosure may transmit and receive data through wireless and/or wired interconnection. Examples of the computing device of the present disclosure may include all types of computing devices capable of computing electronic-formed data.

For example, the computing devices may be realized as fixed or mobile devices, such as a TV, a projector, a mobile phone, a smart phone, a desktop computer, a laptop computer, a digital broadcast terminal, a personal digital assistant (PDA), a portable multimedia player PMP), a navigation device, a tablet PC, a wearable device, a set-top box (STB), a DMB receiver, a radio, a washing machine, a refrigerator, a digital signage, a robot, and a vehicle.

FIG. 2 shows a flowchart of a confidence calibration operation based on label smoothing according to an embodiment of the present disclosure.

First, referring to FIG. 1, the image classifier 140 may include a data classification part 141, a training part 142, and a confidence calibration part 143.

The image classifier may include an artificial intelligence model, which is an image classification model, and the image classification model may include at least one layer. In addition, the image classification model may be a classification model that performs classification on image data when the image data is input.

The data classification part 141 may mean a module that classifies input image data as a particular class. The training part 142 may use a predetermined data set or training data to train a video recognition model such that when image data is input to the image classification model 140, a class corresponding to the image data is output.

The confidence calibration part 143 performs a conventional confidence calibration function. When performing confidence calibration based on label smoothing, the confidence calibration part 143 applies actual probability values to a label smoothing process considering the features of each image, so that confidence calibration is performed by flexibly applying the loss function and the margin according to the class of the image.

The image classification model may operate on the basis of the data classification part, the training part, and the confidence calibration part.

In the meantime, the operations may be controlled through the processor 110.

Hereinafter, a detailed description will be provided.

The computing device 100 for confidence calibration according to an embodiment of the present disclosure may input image data to the image classification model in step S201.

The data classification part 141 of the video recognition model according to an embodiment of the present disclosure may generate logit output values and prediction probability values for the input image data in step S203.

Specifically, the logit output values refer to feature vectors of the input image data. There are as many logit feature values as there are classes, by which the input image data is to be classified.

The prediction probability values may be probability values that correspond to classification classes obtained by inputting the logit output values to a softmax layer. All the prediction probability values may be normalized to values between 0 and 1 by the softmax layer, and the total sum of the output values may always be 1. The maximum value among the prediction probability values is called a confidence value.

According to an embodiment of the present disclosure, the confidence calibration part 143 may output the logit output values and the prediction probability values generated for the image data, and may apply a weighting based on an image classification difficulty level and learnable margin parameters to label smoothing, thereby performing the confidence calibration operation of the image classification model in step S205.

According to an embodiment, the image classification model may output the label smoothing loss function by using the learnable margin parameters or the label smoothing weighting based on the image classification difficulty level or all.

Afterward, the image classification model may be trained by updating the parameters of the deep learning model to minimize an error in step S207.

Herein, the learnable margin parameters may be learned through network loss training in step S207.

Afterward, the image classification model may be trained to minimize the error by using the training part 142. When the number of times that training is performed exceeds the number of times that completion is done ("YES" in step S209), training may be completed.

The computing device according to an embodiment of the present disclosure may evaluate the performance of the confidence calibration function through validation on validation data and performance evaluation on test data in step S211.

Hereinafter, steps S205 and S207 will be described in detail with reference to FIG. 3 and Equation 2.

Figure 3:
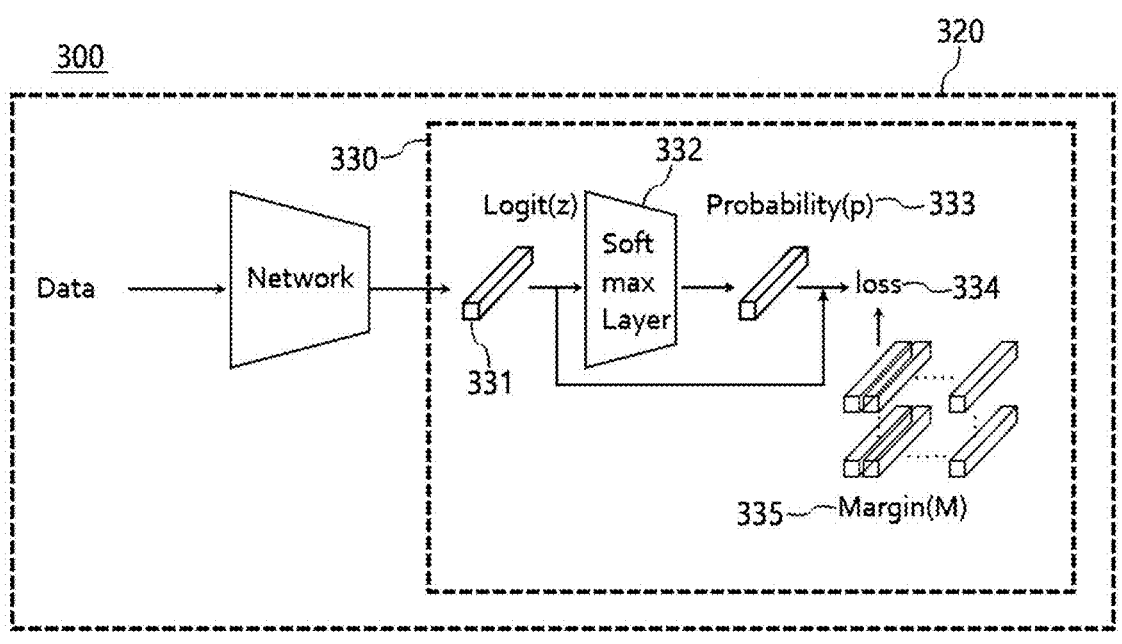
FIG. 3 shows an artificial intelligence model according to an embodiment of the present disclosure.

FIG. 3 shows an artificial intelligence model according to an embodiment of the present disclosure.

The artificial intelligence model 300 shown in FIG. 3 may be the above-described image classification model 300. The image classification model may be a model that outputs an image classification result corresponding to the image data when the image data is input.

The image classification model 300 according to an embodiment of the present disclosure may include a data classification part 320 for classifying image data, and a confidence calibration part 330 for confidence calibration. Specifically, the confidence calibration part 330 may perform confidence calibration using logit output values including feature vectors of the image data input to the image classification model, a softmax layer 332, probability values 333 output from the softmax layer, learnable margin parameters 335, and a loss function 334 to which a weighting is applied on the basis of features of the input image data.

Referring to FIG. 3, the video recognition model 300 is based on the prediction probability values (p) obtained after the logit output values (logit values, z) output from the neural network pass through the last softmax layer. Herein, as many logit output values (logit values) and prediction probability values may be generated as there are data set classes (L). The image classification model finally predicts the image using the class with the greatest probability value (maxp) among the prediction probability values. Herein, the maximum probability value may be set as a confidence value.

"Equation 2" is an equation for calculating the loss function of the image classification model according to an embodiment of the present disclosure.

$$L_{CE} + \lambda \sum_k \max\left(0, \max_j z_j - z_k - M\right) \qquad \text{[Equation 2]}$$

$L_{CE}$: a cross-entropy loss value
$\lambda$: a label smoothing weighting (a weighting of a logit distance loss)

$$\max_j z_j:$$

the maximum value among the logit output values, $z_k$: all values except the maximum value among the logit output values (k=0, . . . , the number of classes−1, k≠j), M: the learnable margin parameters Referring to "Equation 2", differences between $$\max_j z_j$$

(the maximum value among the logit output values) and $z_k$ (all values except the maximum value among the logit values (k=0, . . . , the number of classes−1, k≠j)) are obtained, and the learnable margin parameters are subtracted therefrom, thereby outputting a logit distance.

The label smoothing weighting may be assigned to the logit distance. The confidence calibration part 330 may perform the confidence calibration operation of the image classification model by applying the learnable margin parameters to the loss function (LOSS).

First, the confidence calibration part 330 adjusts the label smoothing weighting based on the image classification difficulty level on the basis of the generated logit output values and prediction probability values for the image data, thereby performing the confidence calibration operation of the image classification model in step S205-1.

Herein, the image classification difficulty level may be set by criteria varying between objects, considering features of input image data.

Figure 4:
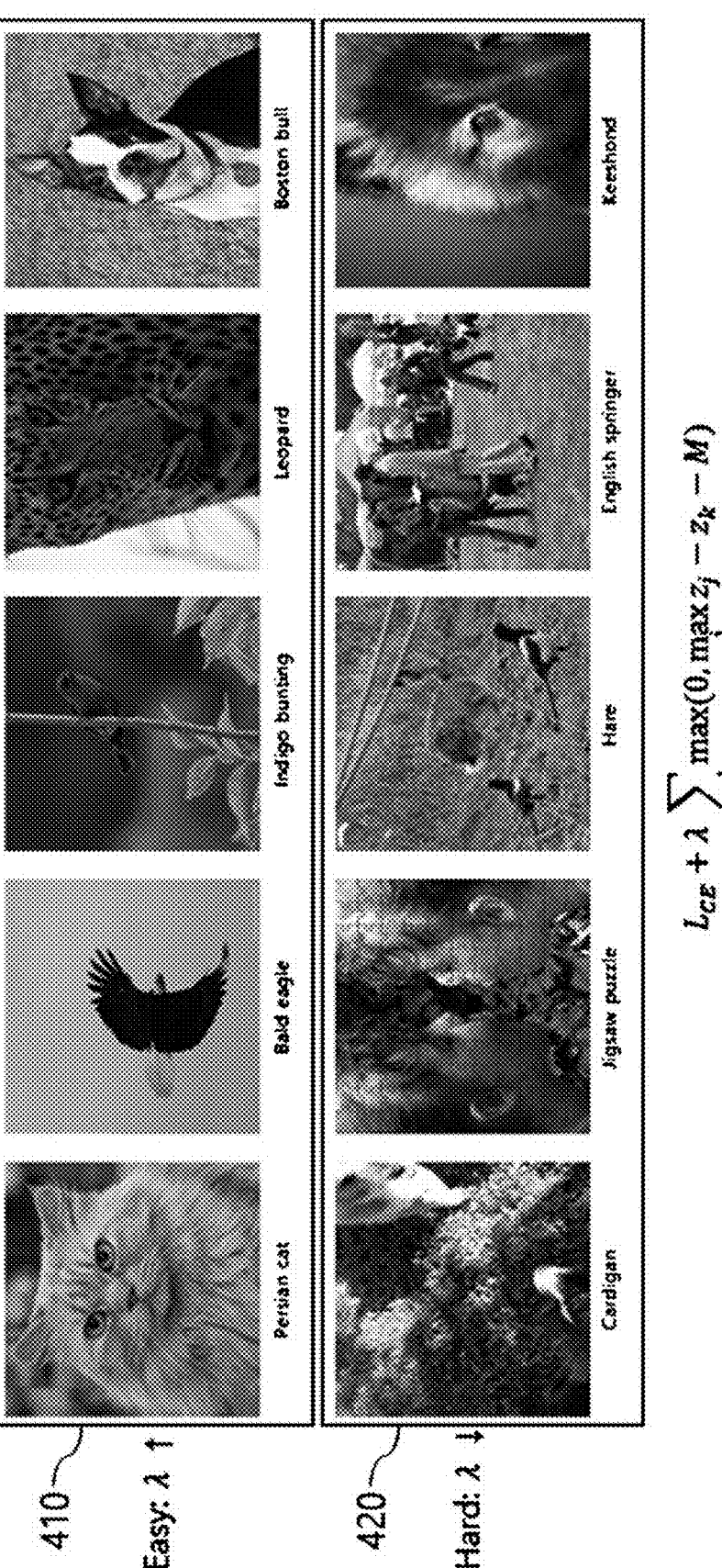
FIG. 4 shows an example of weighting assignment according to an embodiment of the present disclosure.

FIG. 4 is a diagram illustrating a configuration for adjusting a label smoothing weighting on the basis of an image classification difficulty level according to an embodiment of the present disclosure.

Referring to FIG. 4, data 410 (easy instance) with a low image classification difficulty level corresponds to images that are easy for the image classification model to predict, such as when an object is clearly shown in image data and when an object is centered, and may mean the case in which the entropy of the softmax output value (softmax output) is small (delta distribution).

In addition, data 420 (hard instance,) with a high image classification difficulty level corresponds to images that are difficult for the image classification model to predict, such as when an object is partially shown in the image data and when the viewpoint shows a partial area of an object, and may mean the case in which the entropy of the softmax output value (softmax output) is large (uniform distribution).

The image classification model according to an embodiment of the present disclosure may adaptively set the label smoothing weighting according to the image classification difficulty level.

Specifically, the lower the image classification difficulty level, the higher the label smoothing weighting to be set.

The higher the image classification difficulty level, the lower the label smoothing weighting to be set than a predetermined value.

For example, the label smoothing weighting in "Equation 2" may be set to λthe maximum value among the prediction probability values output from the softmax $$\text{layermax}_j p_j.$$

This is because the lower the image classification difficulty level, the larger the maximum probability value (p) for prediction by the image classification model, so that an overconfidence problem can be effectively alleviated by assigning a high weighting.

The confidence calibration part 330 according to an embodiment of the present disclosure may apply the learnable margin parameters to the loss function, thereby performing the confidence calibration operation of the image classification model in step S205-2.

Referring to FIG. 3, the learnable margin parameters (learnable parameters) may be organized as a margin matrix 335 of which the horizontal and vertical sizes are "the number of classes * the number of classes". In the rows and columns of the margin matrix, the margin parameters may be stored in respective columns and rows corresponding to the classes to be compared.

As shown in "Equation 2", the differences between $$\max_j z_j$$

(the maximum value among the logit values) and $z_k$ (all values except the maximum value among the logit values (k=0, . . . , the number of classes−1, k≠j)) are obtained, and the learnable margin parameters are subtracted therefrom, and the confidence calibration part 330 applies the learnable margin parameters to the loss function (LOSS), thereby performing the confidence calibration operation of the image classification model. In addition, the learnable margin parameters may be automatically updated as the loss function of the image classification model 300 is trained.

As shown in the above embodiment, the margin portion is replaced by setting a learnable parameter for each class, and the network learns different margins between classes, thereby solving a problem with a hyperparameter having a fixed value.

Specifically, through the method, when I of which the correct answer class is i is more similar to class j than to class k and has very little similarity to l, such relational feature may be applied in determining overconfidence. Compared to the conventional technology in which overconfidence is determined using the same margin (a predetermined hyperparameter) for classes i and j and for classes i and k and loss is applied with the same criterion and margin for different images $I_1$ and $I_2$, the method according to the present disclosure uses the margin considering the difference between $I_1$ and $I_2$ when determining overconfidence, thereby performing high-accuracy confidence calibration to which image features are applied.

Those skilled in the art of the present disclosure will understand that various exemplary logic blocks, modules, processors, means, circuits, and algorithm steps described in connection with the embodiment described herein may be realized by electronic hardware, various forms of programs or design codes (for easy description, herein, referred to as software), or a combination thereof.

The above-described present disclosure may be realized as computer-readable code on a medium on which a program is recorded. A computer-readable medium includes all types of recording devices in which data readable by a computer system data is stored. Examples of the computer-readable medium include a hard disk drive (HDD), a solid-state disk (SSD), a silicon disk drive (SDD), a ROM, a RAM, a CD-ROM, a magnetic tape, a floppy disk, and an optical data storage device.

What is claimed is:

1. An operation method of a computing device for providing a confidence calibration function based on label smoothing, the operation method comprising:
   (a) inputting image data to be classified into an image classification model;
   (b) outputting, by the image classification model, logit output values and prediction probability values of the image data; and
   (c) outputting, by the image classification model, a label smoothing loss function by using learnable margin parameters or a label smoothing weighting based on an image classification difficulty level or all,
   wherein in the step (c), the outputting of, by the image classification model, the label smoothing loss function by using the label smoothing weighting based on the image classification difficulty level comprises setting the label smoothing weighting adaptively according to the image classification difficulty level and outputting the label smoothing loss function, and
   wherein the setting of the label smoothing weighting adaptively according to the image classification difficulty level comprises setting the label smoothing weighting in a such manner that the lower the image classification difficulty level, the higher the label smoothing weighting, and the higher the image classification difficulty level, the lower the label smoothing weighting.

2. The operation method of claim 1, wherein data of which the image classification difficulty level is high comprises at least one selected from a group of an image in which an object is partially shown in image data, an image in which a viewpoint shows a partial area of an object, and an image difficult for the image classification model to predict.

3. The operation method of claim 1, wherein data of which the image classification difficulty level is low comprises at least one selected from a group of an image in which an object is clearly shown in image data, an image in which an object is centered, and an image easy for the image classification model to predict.

4. The operation method of claim 1, wherein in the step (c), the outputting of, by the image classification model, the label smoothing loss function by using the label smoothing weighting based on the image classification difficulty level comprises:
   determining the label smoothing weighting as the maximum value among the prediction probability values output from a softmax layer; and
   outputting the label smoothing loss function by using the determined label smoothing weighting.

5. The operation method of claim 1, wherein in the step (c), the outputting of, by the image classification model, the label smoothing loss function by using the learnable margin parameters comprises outputting the label smoothing loss function by using a sum of "difference values between the logit output values and the learnable margin parameters" and a cross-entropy loss function.

6. The operation method of claim 1, wherein the learnable margin parameters are organized as a margin matrix of which horizontal and vertical sizes are "the number of classes * the number of classes", and
   the operation method further comprises updating the learnable margin parameters by the image classification model each time confidence calibration is performed using the label smoothing loss function.

7. The operation method of claim 1, wherein in the step (c), the label smoothing loss function is calculated using "Equation 2", and
   the "Equation 2" comprises:

$$L_{CE} + \lambda \sum_k \max\left(0, \max_j z_j - z_k - M\right)$$

$L_{CE}$: a cross-entropy loss value
$\lambda$: the label smoothing weighting $$\max_j z_j:$$

the maximum value among the logit output values
   $z_k$: all values except the maximum value among the logit output values (k=0, . . . , the number of classes−1, k≠j), and
   M: the learnable margin parameters.

8. A computing device for providing a confidence calibration function based on label smoothing, the computing device comprising:
   a memory;
   an image classifier; and
   a processor for controlling operation of the image classifier,
   wherein the processor is configured to
   (a) input image data to be classified into an image classification model,
   (b) make the image classification model output logit output values and prediction probability values of the image data, and
   (c) make the image classification model output a label smoothing loss function by using learnable margin parameters or a label smoothing weighting based on an image classification difficulty level or all,
   wherein the processor is configured to, when the image classification model outputs the label smoothing loss function by using the label smoothing weighting based on the image classification difficulty level in the step (c), determine the label smoothing weighting as the maximum value among the prediction probability values output from a softmax layer.

9. The computing device of claim 8, wherein the processor is configured to, when the image classification model outputs the label smoothing loss function by using the label smoothing weighting based on the image classification difficulty level in the step (c), set the label smoothing weighting adaptively according to the image classification difficulty level.

10. The computing device of claim 9, wherein the processor is configured to, when setting the label smoothing weighting adaptively according to the image classification difficulty level, set the label smoothing weighting in such a manner that the lower the image classification difficulty level, the higher the label smoothing weighting, and the higher the image classification difficulty level, the lower the label smoothing weighting.

11. The computing device of claim 10, wherein data of which the image classification difficulty level is high comprises at least one selected from a group of an image in which an object is partially shown in image data, an image in which a viewpoint shows a partial area of an object, and an image difficult for the image classification model to predict.

12. The computing device of claim 10, wherein data of which the image classification difficulty level is low comprises at least one selected from a group of an image in which an object is clearly shown in image data, an image in which an object is centered, and an image easy for the image classification model to predict.

13. The computing device of claim 8, wherein the processor is configured to, when the image classification model outputs the label smoothing loss function by using the learnable margin parameters in the step (c), output the label smoothing loss function by using a sum of "difference values between the logit output values and the learnable margin parameters" and a cross-entropy loss function.

14. The computing device of claim 8, wherein the learnable margin parameters are organized as a margin matrix of which horizontal and vertical sizes are "the number of classes * the number of classes", and
the processor is configured to update the learnable margin parameters each time confidence calibration is performed using the label smoothing loss function.

15. The computing device of claim 8, wherein the processor is configured to calculate the label smoothing loss function by using Equation 2 when the step (c) is performed, and the Equation 2 comprises $$L_{CE} + \lambda \sum_{k} \max\left(0, \ \max_{j} z_j - z_k - M\right)$$

$L_{CE}$: a cross-entropy loss value
$\lambda$: the label smoothing weighting $$\max_{j} z_j:$$

the maximum value among the logit output values,
$z_k$: all values except the maximum value among the logit output values ($k=0, \ldots$, the number of classes$-1$, $k{\neq}j$), and
M: the learnable margin parameters.

* * * * *